(12) United States Patent
Kikuchi et al.

(10) Patent No.: US 6,326,743 B1
(45) Date of Patent: Dec. 4, 2001

(54) HORIZONTAL LINEARITY CORRECTING CIRCUIT

(75) Inventors: Ken Kikuchi, Tokyo; Junzo Watanabe; Hidetaka Honji, both of Kanagawa, all of (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/462,390
(22) PCT Filed: May 7, 1999
(86) PCT No.: PCT/JP99/02378
§ 371 Date: Apr. 19, 2000
§ 102(e) Date: Apr. 19, 2000
(87) PCT Pub. No.: WO99/57888
PCT Pub. Date: Nov. 11, 1999

(30) Foreign Application Priority Data

May 7, 1998 (JP) .................................................. 10-125065

(51) Int. Cl.[7] ..................................................... G09G 1/04
(52) U.S. Cl. ............................ 315/370; 315/395; 315/411
(58) Field of Search .................................. 315/370, 371, 315/391, 394, 395, 396, 399, 408, 410, 364, 369

(56) References Cited

U.S. PATENT DOCUMENTS

| | | | |
|---|---|---|---|
| 4,206,388 | 6/1980 | Ishigaki et al. | 315/371 |
| 4,242,714 | 12/1980 | Yoshida et al. | 361/152 |
| 4,634,938 | 1/1987 | Haferl | 315/371 |
| 4,673,984 | * 6/1987 | Kikuchi et al. | 315/411 |
| 4,786,612 | 11/1988 | Yau et al. | 437/47 |
| 5,349,274 | * 9/1994 | Watanabe et al. | 315/395 |
| 5,363,022 | * 11/1994 | Kitou et al. | 315/408 |
| 5,517,090 | * 5/1996 | Bando | 315/370 |
| 5,742,152 | * 4/1998 | Lee | 323/273 |
| 5,949,201 | * 9/1999 | Suzuki et al. | 315/370 |

FOREIGN PATENT DOCUMENTS

| | | | |
|---|---|---|---|
| 5083578 | 4/1993 | (JP) | H04N/3/16 |
| 6423685 | 1/1989 | (JP) | H04N/3/23 |
| 2107067 | 4/1990 | (JP) | H04N/3/23 |
| 5091361 | 4/1993 | (JP) | H04N/3/23 |
| 9191413 | 7/1997 | (JP) | H04N/3/23 |
| 11127364 | 5/1999 | (JP) | H04N/3/23 |

* cited by examiner

*Primary Examiner*—Don Wong
*Assistant Examiner*—Wilson Lee
(74) *Attorney, Agent, or Firm*—Jay H. Maioli

(57) ABSTRACT

An appartus for adjusting the correction amount of a horizontal linearity and suppressing the amplitude of a horizontal deflection current in an image display device. A switching element 11 is provided between both ends of an S-curve correction capacitor 5 connected in series to a horizontal deflection coil 4, and by turning on this switching element 11 during a horizontal retrace period to discharge the S-curve correction capacitor 5, and controlling also the ON time of this switching element 11, the linearity in the horizontal period is corrected.

2 Claims, 5 Drawing Sheets

FIG. 2A
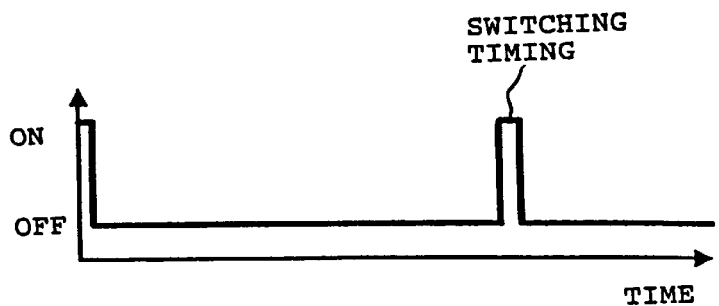
FIG. 2B VOLTAGE AT BOTH ENDS OF S-CURVE CORRECTION CAPACITOR
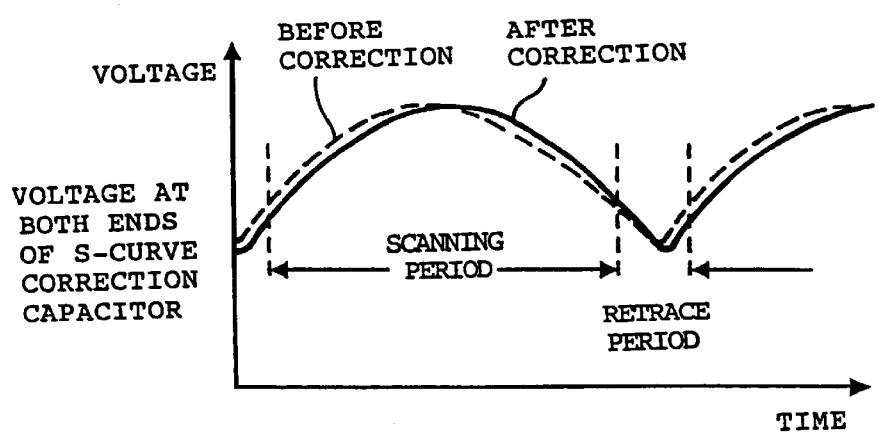
FIG. 2C
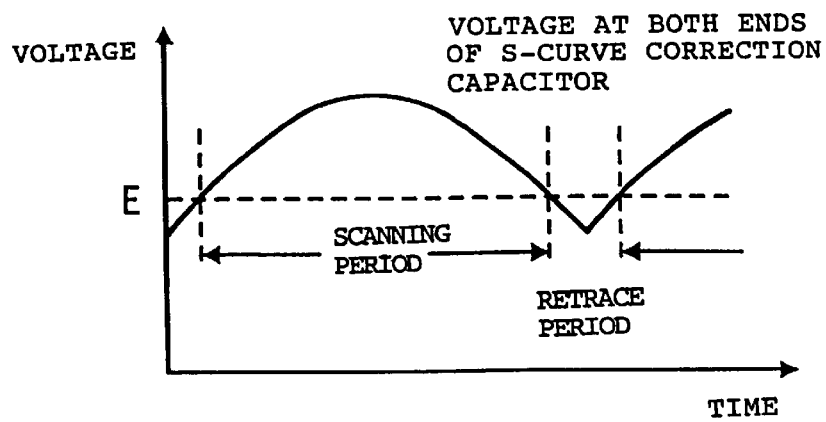

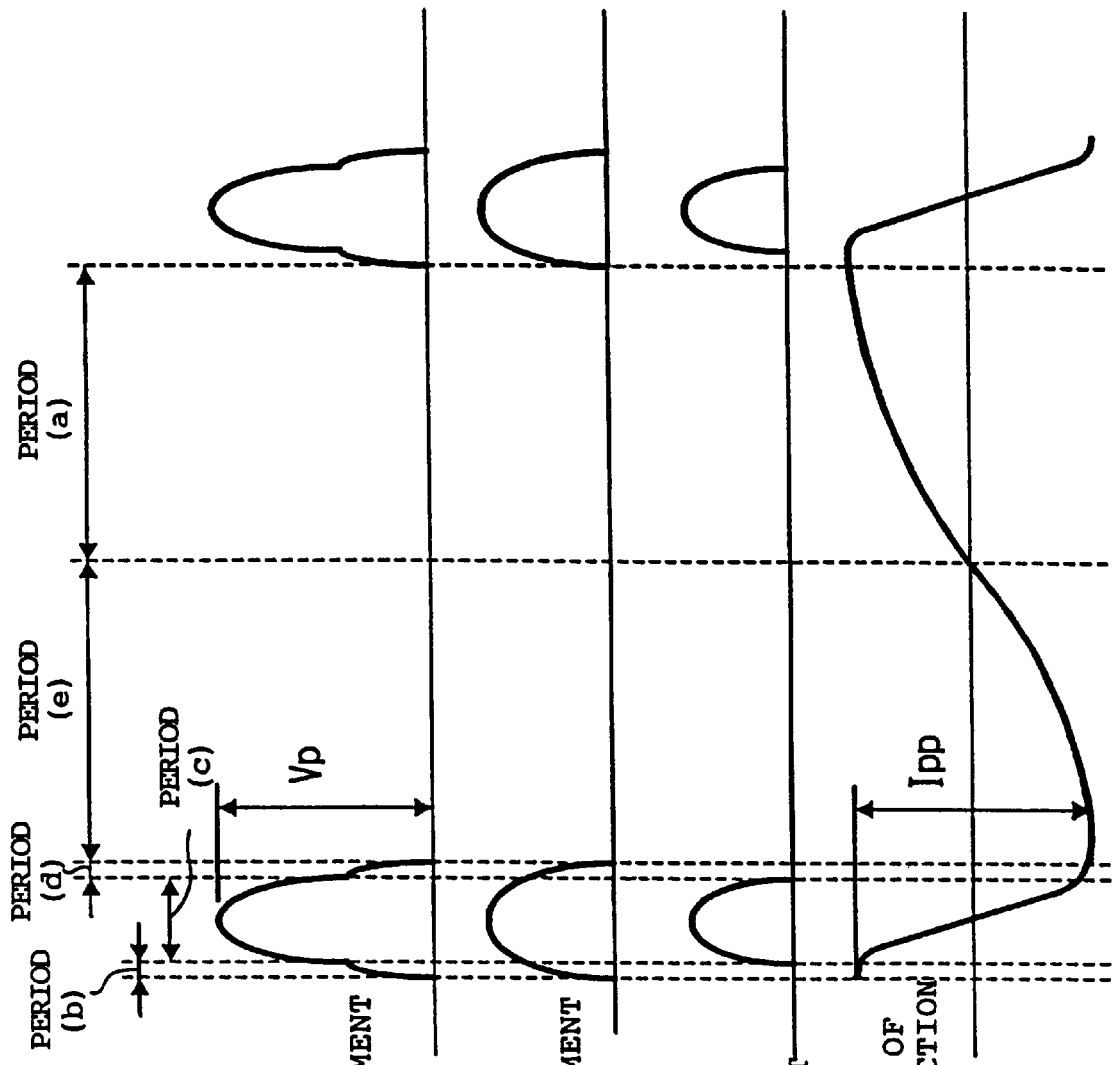

HORIZONTAL LINEARITY CORRECTING CIRCUIT

TECHNICAL FIELD

The present invention relates to a horizontal deflection circuit used in an image display device such as a television receiver and a display device using a cathode-ray tube (CRT) or the like, and more particularly to a horizontal deflection circuit having horizontal linearity correction.

BACKGROUND ART

Generally, in an image display device such as a television receiver using a cathode-ray tube (CRT) or the like, a horizontal deflection circuit is provided in order to flow a sawtooth wave current in a horizontal deflection coil.

This horizontal deflection circuit is constructed, for example, by connecting a damper diode and a resonance capacitor parallel between the collector and the emitter of an npn-type horizontal output transistor for creating a switching element, connecting a series circuit of a horizontal deflection coil and an S-curve correction capacitor in parallel between the collector and the emitter of the horizontal output transistor, connecting the collector of the horizontal output transistor to the positive electrode of a direct-current power source through a primary winding of a flyback transformer, and connecting the emitter of the horizontal output transistor to the negative electrode of the direct-current power source.

In this horizontal deflection circuit, in the horizontal scanning period, the horizontal output transistor or the damper diode is in a conductive state, and the horizontal deflection current in the horizontal scanning period is maintained by the series resonance of the S-curve correction capacitor and the horizontal defection coil.

At this time, however, since the circuit elements such as the horizontal deflection coil, the horizontal output transistor, the damper diode and the like consume the electric power, the amplitude of the horizontal deflection current gradually decreases during the horizontal scanning period. Thus the amplitude of the horizontal deflection current at the end of the horizontal scanning period is a smaller value than the amplitude of the horizontal deflection current at the start of the horizontal scanning period.

Moreover, since an internal resistance is present in the horizontal deflection coil, the voltage across both ends of the horizontal deflection coil is decreased by the portion of the product of the horizontal deflection current and this internal resistance. Accordingly, as the horizontal deflection current increases, the changing portion of the current decreases.

Generally, since in the image display device, scanning is carried out horizontally from the left side to the right side facing the screen, when it is observed as the image on the cathode-ray tube, the right side of the image looks contracted, and this is called "right contraction." Instead of "right contraction," it may be also called "left expansion."

To correct this right contraction, in an image display device using the cathode-ray tube, a saturable reactor magnetically biased by a permanent magnet called a horizontal linearity coil is used. In this horizontal linearity coil, the working point of the characteristic curve indicating the inductance value corresponding to the current value is shifted in the current axial direction by the permanent magnet. Accordingly, the horizontal linearity coil has the property in which the inductance is different depending on the current flowing direction.

When this horizontal linearity coil is connected in series to the horizontal deflection coil so that the inductance may be maximum upon the start of horizontal scanning, in the first half of horizontal scanning, apparently, the impedance of the horizontal deflection coil becomes large and the horizontal deflection current is limited thereby, but in the latter half of horizontal scanning, the horizontal deflection current is decreased by power consumption in the horizontal deflection circuit, but since the inductance of the horizontal linearity coil is decreased, apparently, the impedance of the horizontal deflection coil is small, so that decrease of current can be prevented.

In such linearity correction by the horizontal linearity coil, the correction effect thereof is determined by the quality of the magnetic material used in the horizontal linearity coil and the strength of the magnet, the relation between the current and the inductance may change sharply more or less, and the correction effect may change rapidly depending on the linearity changes, and it is hard to obtain an ideal correction effect.

Image distortion in the image display device using the cathode-ray tube includes, aside from the right contraction distortion mentioned above, an image distortion called a pincushion distortion. This pincushion distortion occurs due to a difference in the scanning width on the screen, in the upper and lower portions and central portion of the screen, with respect to the same deflection angle of the electron beam.

To correct this pincushion distortion, it is known to modulate the horizontal deflection current by using a saturable reactor, same as in the case of linearity correction. In this case, since the horizontal deflection current amount varies between the upper and lower portions and the central portion of the screen, the correction amount of pincushion distortion is also different, and an imbalance is caused in the correction state of pincushion between the right and left sides of the screen.

Moreover, in the aforementioned image display device using the cathode-ray tube, if the center of horizontal deflection and the central position of the screen are not matched due to fluctuations in the image pickup tube and the horizontal deflection coil, an independent horizontal centering circuit was needed in order to match them.

Further, since the horizontal linearity coil is used by connecting in series to the horizontal deflection coil, the impedance of this horizontal deflection coil must be set smaller by the corresponding amount, and the amplitude of the required horizontal deflection current becomes larger.

In the light of these problems, it is hence an object of the invention to adjust the correction amount of the horizontal linearity so that an ideal correction effect may be obtained.

It is also an object of the invention to suppress the amplitude of the horizontal deflection current to be small.

It is other object of the invention to get rid of an independent horizontal centering circuit.

DISCLOSURE OF THE INVENTION

A horizontal deflection circuit of the invention is such one that a switching element is provided between both ends of an S-curve correction capacitor connected in series to a horizontal deflection coil. This switching element is turned on during the horizontal retrace period to discharge the accumulated electric charge in the S-curve correction capacitor, and the ON time of the switching element is controlled to correct the linearity in the horizontal period.

According to the invention, since the correction amount of the horizontal linearity can be made variable by controlling the ON time of the switching element, an appropriate correction amount of horizontal linearity can be easily obtained even if the amplitude of the horizontal deflection current varies.

Moreover, the invention does not require any particular part to be inserted in series to this horizontal deflection coil for horizontal linearity correction, and hence is not accompanied by extra voltage drop, and therefore the impedance of the horizontal deflection coil can be set large and the amplitude of the horizontal deflection current can be suppressed small.

BRIEF DESCRIPTION OF DRAWINGS

FIG. 2 is a diagram used for explanation of the invention.

FIG. 4 is a diagram presented for explanation of FIG. 3.

BEST MODE FOR CARRYING OUT THE INVENTION

Figure 1:
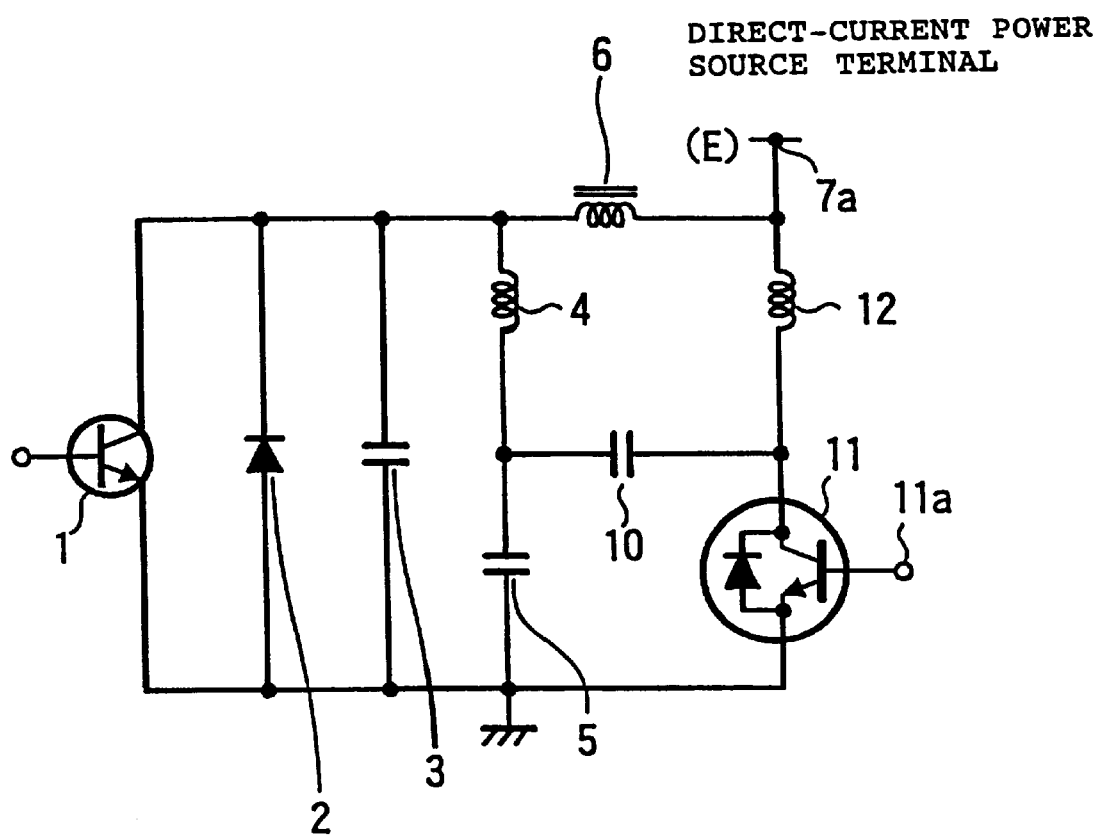
FIG. 1 is a structural diagram showing an example of an embodiment of a horizontal deflection circuit according to the invention.

Referring now to FIG. 1 and FIG. 2, an example of an embodiment of a horizontal deflection circuit according to the invention will be described below.

In FIG. 1, a damper diode 2 and a resonance capacitor 3 are connected in parallel between the collector and the emitter of an npn-type horizontal output transistor 1 for creating a switching element, a series circuit of a horizontal deflection coil 4 and an S-curve correction capacitor 5 is connected parallel between the collector and the emitter of the horizontal output transistor 1, the collector of the horizontal output transistor 1 is connected to a direct-current power source terminal 7a to which a positive direct-current voltage is applied through a primary winding of a flyback transformer 6, and the emitter of the horizontal output transistor 1 is grounded.

In this example, the connection point between the deflection coil 4 and the S-curve correction capacitor 5 is grounded through a series circuit of a capacitor 10 for blocking a direct current and a switching element 11 of compound elements composed of a diode and a transistor. That is, the switching element 11 is connected equivalently to the S-curve correction capacitor 5.

The connection middle point between the capacitor 10 and the switching element 11 is connected to the direct-current power source terminal 7a through a choke coil 12 for blocking a high frequency.

In this example, the switching element 11 is turned on in the retrace period of horizontal scanning as shown in FIG. 2A, and this ON duration can be made variable by the pulse width modulation of a switching pulse.

The horizontal deflection circuit shown in FIG. 1 carries out the horizontal deflect operation same as the conventional horizontal deflection circuit except for the operations in relation to the capacitor 10, the switching element 11, and the choke coil 12. In this case, the voltage at both ends of the S-curve correction capacitor 5 becomes a parabolic waveform centered on a direct-current voltage E applied to the direct-current power source terminal 7a as shown in FIG. 2C.

The voltage at the connection point between the switching element 11 and the capacitor 10 is, although the direct-current component is blocked by this capacitor 10, also a parabolic waveform centered on the direct-current voltage E applied to the direct-current power source terminal 7a as shown in FIG. 2C because the direct-current component from the direct-current power source terminal 7a is superposed thereon through the choke coil 12.

Explained next is the operation of the horizontal linearity correction circuit of the horizontal deflection circuit shown in FIG. 1. A control terminal 11a of the switching element 11 is supplied with a switching signal for turning off the switching element 11 during the horizontal scanning period of horizontal scanning and turning on the switching element 11 during the retrace period as shown in FIG. 2A.

Since the horizontal deflection current is flowing from the S-curve correction capacitor 5 used as the power source in the horizontal scanning period, the change rate of horizontal deflection current and the voltage at both ends of the S-curve correction capacitor 5 are in a proportional relation.

Accordingly, when the horizontal deflection current is attenuated in the latter half of the horizontal scanning period, the voltage at both ends of the S-curve correction capacitor 5 also decreases in the latter half of this horizontal scanning period (see dotted line in FIG. 2B).

During the retrace period, when the switching element 11 is turned on, the current flows from the S-curve correction capacitor 5 through the switching element 11, and the voltage across both ends of the S-curve correction capacitor 5 decreases. As a result, because the rising timing of the voltage across both ends of the S-curve correction capacitor 5 is delayed, in the first half of the horizontal scanning period, the voltage across both ends of the S-curve correction capacitor 5 decreases, and in the latter half of the horizontal scanning period, the voltage across both ends of the S-curve correction capacitor 5 elevates (see solid line in FIG. 2B).

When the ON time of the switching element 11 is made longer, the current flows from the S-curve correction capacitor 5 through the switching element 11 by that extent. Therefore, the rising timing of the voltage across both ends of the S-curve correction capacitor 5 is further delayed, and the correction amount can be increased.

Therefore, by modulating the ON time of the switching element 11 at the vertical scanning period, the correction amount of horizontal linearity can be changed with the vertical scanning period, so that imbalance of right and left, pincushion distortion and the like can be corrected.

In this case, since the ON time of the switching element 11 is during the horizontal retrace period, there is no significant change in the correction amount during the horizontal scanning period, and hence it hardly causes sudden change in the correction amount which was hard to avoid in the conventional horizontal linearity coil.

Moreover, this example does not require any particular part to be inserted in series to the horizontal deflection coil 4 for horizontal linearity correction, and hence is not accompanied by extra voltage drop. As a result, the impedance of the horizontal deflection coil 4 can be set large and the horizontal deflection current can be suppressed small.

Generally, in the horizontal deflection circuit, a horizontal centering circuit is required, but in this example, since the correction characteristic can be easily controlled by the ON time of the switching element 11, the centering operation can be achieved by varying the phase of video signal and the ON time of the switching element 11. Therefore, the horizontal centering circuit can be omitted.

Figure 3:
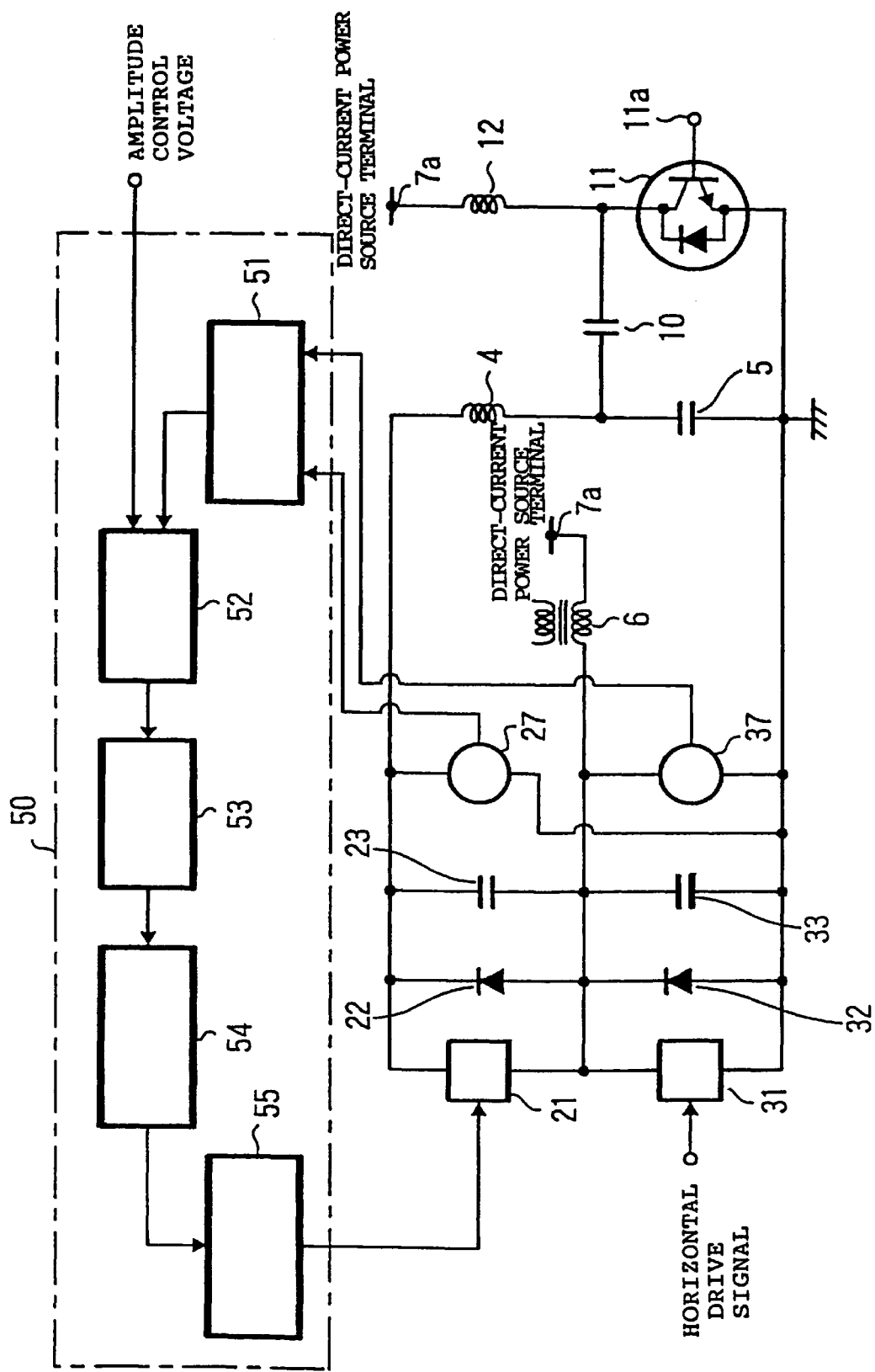
FIG. 3 is a structural diagram showing other example of the embodiment according to the invention.

FIG. 3 shows another embodiment of the invention. Although FIG. 3 will be explained, the parts corresponding to FIG. 1 are identified with same reference numerals.

In the horizontal deflection circuit in FIG. 3, a parallel circuit of a switching element 31 of horizontal output, a damper diode 32 and a resonance capacitor 33, and a parallel circuit of a switching element 21, a damper diode 22, and a resonance capacitor 23 are connected in series, and power is applied to the connection point therebetween through a primary winding of a flyback transformer 6. The opposite end of the connection point of the switching element 31 is grounded, and the opposite end of the connection point of the switching element 21 is connected to a horizontal deflection coil 4, and one terminal of an S-curve correction capacitor 5 is connected in series to this horizontal deflection coil 4, while the other end of the S-curve correction capacitor 5 is grounded.

This horizontal deflection circuit comprises pulse reading circuits 37, 27 for reading the terminal voltages of the switching elements 31, 21, and a switching element control circuit 50 for controlling on/off of the switching element 21 by performing a specified operation depending on the voltages.

The operation of this circuit will be described below while referring to FIG. 3, FIG. 4, and FIG. 5.

In FIG. 3, a horizontal drive signal is put into the switching element 31 of horizontal output, and the switching element 31 of horizontal output is turned on. At the same time, the switching element 21 is also turned on by the drive signal from the switching element control circuit 50. Thus, the both are set in a conductive state, and a deflection current flows through the horizontal deflection coil 4. By contrast, when turning off, it is driven so that the switching element 31 may be turned off earlier than the switching element 21, and the retrace period (horizontal retrace period) starts. During the retrace period, the switching element 21 is on/off-controlled by the switching element control circuit 50. This series of operations will be explained below by dividing the horizontal deflection period and using an equivalent circuit.

Trace Period (a)

Figure 5A:
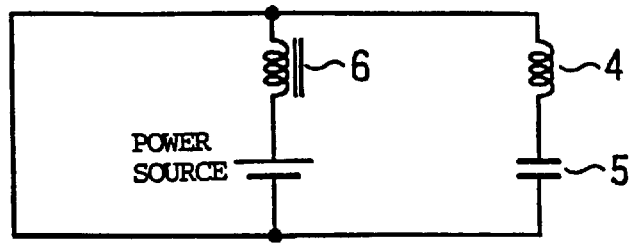
FIG. 5 is an equivalent circuit diagram presented for explanation of FIG. 3.

The trace period (a) is a period in which the both switching elements 31, 21 are conducting, and an equivalent circuit is as shown in FIG. 5A, which is same in constitution as the horizontal deflection circuit of one stage of the switching element in the prior art. At this time, both of the deflection current and the flyback transformer current increases at an inclination corresponding to the voltage across both ends of the S-curve correction capacitor 5 and the supply voltage, respectively. The waveform of deflection current at this time is shown in FIG. 4D.

Initial Phase of Retrace Period

Figure 5B:
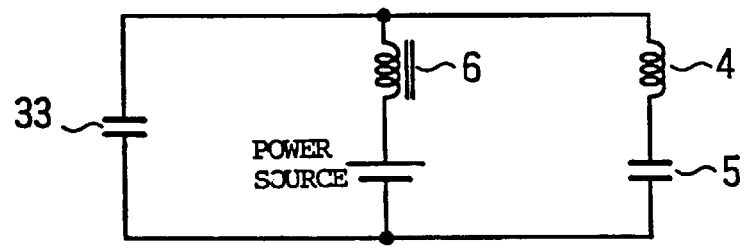

To get into the retrace period, first the switching element 31 is turned off by the horizontal drive signal. At this time, since the switching element 21 is still conducting, an equivalent circuit is as shown in FIG. 5B, which is similar to an ordinary horizontal deflection circuit except that there are two resonance capacitors. The currents flowing through the flyback transformer 6 and the horizontal deflection coil 4 at this time begin to flow into the resonance capacitor 33, a voltage is generated across both ends of the resonance capacitor 33, and accordingly the current starts inverting action. That is, the resonance action, its voltage and current waveform are transformed into the waveforms shown in period (b) in FIG. 4.

OFF Period of Switching Element 21 in Retrace Period

Figure 5C:
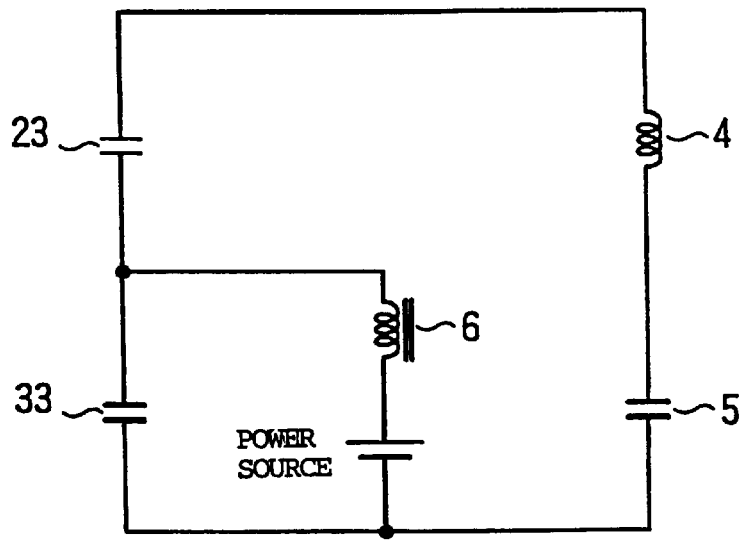

After the deflection current reaches 0 in the latter half of the retrace period, even if the switching element 21 is turned off, since the damper diode 22 is present, the equivalent circuit remains the same as in FIG. 5B, but when the switching element 21 is turned off before the deflection current reaches 0 in the first half of the retrace period, the equivalent circuit changes to the state shown in FIG. 5C, and another resonance capacitor 23 is connected in series to the horizontal deflection coil 4.

The deflection current also flows into the resonance capacitor 23, so that a voltage is also generated across both ends of the resonance capacitor 23. Thus, a pulse voltage larger than the pulse across both ends of the switching element 31 can be applied to both ends of the horizontal deflection coil 4 (see FIG. 4A).

Herein, the peak value of the retrace pulse voltage across the both ends of the switching element 11 is determined uniquely by the ratio among the supply voltage, the retrace time and the trace time ratio, and becomes constant. Therefore, this pulse (see FIG. 4B) can be boosted by the flyback transformer 6 to obtain a high voltage to be used in the electron gun of the cathode-ray tube.

Second Half of Retrace Period

In the retrace period, when all the electric charge flowing into the resonance capacitors 33, 23 flows out and the voltage at both ends becomes 0, the damper diode conducts automatically and terminates the operation (the diode should be an ideal diode for the sake of simplicity).

The current flowing into the resonance capacitor 23 is always smaller than the current flowing into the resonance capacitor 33, and the electric charge of the resonance capacitor 23 disappears earlier, and the damper diode 22 conducts earlier than the damper diode 32. Accordingly, the pulse generated across both ends of the switching element 21 is smaller in the pulse width than the pulse generated across both ends of the switching element 31 (see period (c) in FIGS. 4B, C).

Further, when the OFF timing of the switching element 21 is delayed, the current flowing into the resonance capacitor 23 is much smaller. Thus, the pulse across both ends of the switching element 21 at this time is much smaller in the pulse width, and lower in the pulse height. That is, by controlling the phase of OFF timing of the switching element 21, the retrace pulse voltage applied across the both ends of the horizontal deflection coil 4 can be controlled, so that the amplitude of the deflection current can be substantially varied.

In FIG. 4, period (d) is the same as period (b) in the equivalent circuit, and its explanation is omitted.

Trace Period (e)

When the damper diode 22 conducts in this way, the circuit returns to the equivalent circuit in FIG. 5B, and the retrace operation continues the same as in the ordinary deflection circuit until the voltage across both ends of the resonance capacitor 33 becomes 0. At the end of the trace operation, the circuit returns to the form of equivalent circuit in FIG. 5A, thereby getting into the trace period (e). In this trace period (e), the horizontal deflection current flows in the forward direction of the damper diodes 32, 22 from the horizontal deflection coil 4 (see FIG. 4D). In this period, the switching elements 31, 21 are set in conductive state to be ready for the next trace period (a).

As the horizontal deflection current repeats these deflection periods (a), (b), (c), (d) and (e), the horizontal deflection coil 4 forms a horizontal deflection magnetic field.

Detail is discussed below about the method of adjusting the pincushion distortion and the horizontal screen size, by controlling the OFF timing of the switching element and hence by varying the amplitude of the horizontal deflection current.

The maximum amplitude (PP value) of horizontal deflection current, Ipp, is proportional to the integrated value of the retrace pulse voltage applied across both ends of the horizontal deflection coil in the trace period. Herein, the retrace pulse voltage is about 1200 to 2200 volts, and it is divided into a low voltage suited to processing, and this voltage is compared with a reference voltage expressing the amplitude of horizontal deflection, and by integrating that difference, the drive signal of the switching element is fed back so that this integrated value may be 0, thereby controlling the horizontal deflection current Ipp with high precision. The switching element control circuit 50 shown in FIG. 3 provides an example.

In this example, retrace pulse voltages applied to the terminals of the switching elements 31, 21 are respectively detected by the pulse reading circuits 37, 27. The detected voltages are the retrace pulse voltages divided by using the capacitor dividing means or the like. The detected voltage is put into the switching element control circuit 50, and the retrace pulse voltage (divided value) of the switching element 21 is subtracted from the retrace pulse voltage (divided value) of the switching element 31, by using a subtractor 51 such as an operational amplifier or the like. This differential voltage and the amplitude control voltage corresponding to a specified horizontal amplitude are compared in a comparator 52. This amplitude control voltage is usually added with a parabolic voltage for correcting the pincushion distortion.

The compared voltage is integrated by an integrator 53 to be a direct-current voltage, and is input into a phase regulator 54 as a signal for adjusting the phase (OFF timing) of the drive signal of the switching element 21. The timing pulse formed by the phase regulator 54 is formed as a sufficient drive signal for driving the switching element 21 by a drive waveform generator 55. By such a feedback loop, while controlling the OFF timing, the switching element 21 issues a deflection current.

This is the operation when the closed loop control system of OFF timing is in a stable operation state, but due attention is needed because the operation may be different in a transient period such as a feeding moment of the power source depending on the circuit configuration.

In the control system shown in FIG. 3, the area obtained by subtracting the voltage waveform (divided value) of the retrace pulse of the switching element 21 from the voltage waveform (divided value) of the retrace pulse of the switching element 31 changes linearly with respect to the amplitude of the deflection current. At the rising-up of the power source, the feedback loop works so that retrace pulse may not occur across both ends of the switching element 21 until the subtracted area reaches a certain size. That is, the retrace pulse does not occur across both ends of the switching element 21 until the retrace pulse across both ends of the switching element 31 reaches a specified crest height, so that a stable rising-up is realized.

In the horizontal linearity correction circuit shown in FIG. 3, the connection middle point between the horizontal deflection coil 4 and the S-curve correction capacitor 5 is grounded through the series circuit of the capacitor 10 for blocking the direct current. The switching element 11, and the connection middle point between the capacitor 10 and the switching element 11 is connected to the direct-current power source terminal 7a through the choke coil 12. The operation of this horizontal linearity correction is to turn off the switching element 11 during the horizontal scanning period, and turn on the switching element 11 during the retrace period.

The horizontal deflection current is flowing using the S-curve correction capacitor 5 as the power source in the scanning period, and therefore the change rate of the horizontal deflection current and the voltage across both ends of the S-curve correction capacitor 5 are in a proportional relation. Accordingly, when the deflection current is attenuated in the latter half of the scanning period, the voltage across both ends of the S-curve correction capacitor 5 also decreases in the latter half of the scanning period (dotted line in FIG. 2B). In the retrace period, when the switching element 11 is turned on by the switching signal as shown in FIG. 2A, the current flows from the S-curve correction capacitor 5 through the switching element 11, and the voltage across both ends decreases. As a result, the rising timing of the voltage across both ends of the S-curve correction capacitor 5 is delayed, so that the voltage across both ends decreases in the first half of the scanning period, while the voltage across both ends rises up in the latter half (solid line in FIG. 2B).

When the ON time of this switching element 11 is made longer, the current flows from the S-curve correction capacitor 5 through the switching element 11 by that amount. Therefore, the rising timing of the voltage across both ends of the S-curve correction capacitor 5 is further delayed, and hence the correction amount can be increased. Therefore, by modulating the ON time of switching in the vertical scanning period, the correction amount of horizontal linearity can be changed at the vertical scanning period.

Also in the example shown in FIG. 3, two switching elements 31, 21 are used, a voltage of about 2 kV can be applied to the horizontal deflection coil 4, and by adjusting the horizontal deflection current of double speed scanning to about that of the normal scanning, the horizontal deflection circuit capable of saving power consumption and reducing cost substantially.

The horizontal linear correction circuit of the invention is not limited to the illustrated example alone, but various modifications can be considered. For example, the direct current blocking capacitor 10 in FIG. 1 and FIG. 3 may be connected in series to the horizontal deflection coil 4.

Also, the invention is not limited to the illustrated example alone, but may be realized in various constitutions within the scope of the invention.

According to the invention, since the correction amount of horizontal linearity can be varied by controlling the ON time of the switching element, an appropriate correction amount of horizontal linearity can be easily obtained even if the amplitude of the horizontal deflection current is changed.

Moreover, according to the invention, there is no part to be inserted in series to the horizontal deflection coil for correcting the horizontal linearity, and there is no accompanying extra voltage drop. Therefore, the impedance of the horizontal deflection coil can be set large and the horizontal deflection current can be suppressed small, which is beneficial for saving power consumption and cost.

Further, according to the invention, since the horizontal centering circuit can be omitted, the cost is advantageous.

In the invention, sudden change of the correction amount of the horizontal linearity is less likely to occur as compared with the prior art.

According to the invention, by the fact that two switching elements are used, a voltage of about 2 kv can be applied to the horizontal deflection coil, and the horizontal deflection current of double speed horizontal scanning can be adjusted to that of ordinary horizontal scanning, since this horizontal linearity correction circuit is incorporated into the horizontal deflection circuit capable of saving power consumption and lowering cost significantly, greater effects are found in the view of power consumption, cost, and correction characteristic.

What is claimed is:

1. A method of correcting linearity in a horizontal period with a horizontal deflection circuit comprising the steps of:

grounding one end of a first parallel circuit formed by connecting a first switching element, a first damper diode, and a first resonance capacitor in parallel;

connecting another end of said first parallel circuit to a second parallel circuit formed by connecting a second switching element, a second damper diode and a resonance capacitor in parallel;

connecting the first parallel circuit to a direct-current lower source terminal through a primary winding of a fly back transformer;

grounding another end of said second parallel circuit through a series circuit of a horizontal deflection coil and an S-curve correction capacitor; and providing switching element control means for switching said first switching element by a horizontal drive signal, and controlling an OFF start period and an OFF period of said second switching element, wherein a third switching element is provided between both ends of said s-curve correction capacitor, with said third switching element turned on during a horizontal retrace period to discharge said S-curve correction capacitor, and an ON time of said third switching element is controlled to correct linearity in a horizontal period.

2. A horizontal linearity correction circuit for a horizontal deflection circuit, comprising:

a first parallel circuit formed by connecting a first switching element, a first damper diode, and a first resonance capacitor in parallel, wherein one end of said first parallel circuit is connected to ground;

a second parallel circuit formed by connecting a second switching element, a second damper diode, and a second resonance capacitor in parallel, wherein another end of said first parallel circuit is connected to said second parallel circuit;

a direct-current power source terminal connected to said another end of said first parallel circuit through a primary winding of a flyback transformer;

a series circuit of a horizontal deflection coil and an S-curve correction capacitor, wherein another end of said second parallel circuit is connected to ground;

switching element control means for switching said first switching element by a horizontal drive signal and controlling an OFF start period and an OFF period of said second switching element; and a third switching element connected across both ends of said S-curve correction capacitor, wherein said third switching element is turned ON during a horizontal retrace period to discharge said S-curve correction capacitor and an ON time of said third switching element is controlled to correct linearity in a horizontal period.

* * * * *